United States Patent
Chen

(10) Patent No.: US 10,327,517 B2
(45) Date of Patent: Jun. 25, 2019

(54) BUCKLE

(71) Applicant: Silong Chen, Guangdong (CN)

(72) Inventor: Silong Chen, Guangdong (CN)

( * ) Notice: Subject to any disclaimer, the term of this patent is extended or adjusted under 35 U.S.C. 154(b) by 0 days.

(21) Appl. No.: 15/638,332

(22) Filed: Jun. 29, 2017

(65) Prior Publication Data

US 2019/0090593 A1  Mar. 28, 2019

(30) Foreign Application Priority Data

Apr. 18, 2017 (CN) .......................... 2017 1 0251588

(51) Int. Cl.
| | |
|---|---|
| *A44B 11/25* | (2006.01) |
| *A44B 11/02* | (2006.01) |
| *A01K 27/00* | (2006.01) |

(52) U.S. Cl.
CPC .......... *A44B 11/2592* (2013.01); *A44B 11/02* (2013.01); *A01K 27/001* (2013.01)

(58) Field of Classification Search
CPC .... A44B 11/2592; A44B 11/02; A01K 27/001
See application file for complete search history.

(56) References Cited

U.S. PATENT DOCUMENTS

| | | | | |
|---|---|---|---|---|
| 2,153,077 A * | 4/1939 | Clarke | ............... | A44B 11/2519 24/634 |
| 3,605,210 A * | 9/1971 | Lohr | ................... | A44B 11/2511 24/635 |
| 6,965,231 B1 * | 11/2005 | Cinoglu | ............... | A61B 5/0555 324/300 |
| 7,350,277 B1 * | 4/2008 | Canfield | .............. | A44B 11/253 24/634 |
| 7,520,036 B1 * | 4/2009 | Baldwin | ............ | A44B 11/2523 24/635 |
| 9,521,882 B2 * | 12/2016 | Hung | ................... | A44B 11/2511 |
| 2007/0199182 A1 * | 8/2007 | Johnson | ............. | A44B 11/2542 24/265 BC |
| 2011/0107565 A1 * | 5/2011 | Shen | ..................... | A44B 11/266 24/633 |

* cited by examiner

*Primary Examiner* — Robert Sandy
*Assistant Examiner* — David M Upchurch

(57) ABSTRACT

An improved buckle includes a plastic shell, an inserting element, and a lock core. A horizontal socket fitting with the inserting element and a cylindrical mounting slot for mounting the lock core are formed on the plastic shell, the cylindrical mounting slot communicating with the horizontal socket. The horizontal socket includes a guiding block, and the inserting element includes an inserting piece for inserting into the horizontal socket to cooperate with the lock core, with two triangular notches symmetrically and a guiding groove cooperating with the guiding block formed thereon. The buckle has advantages of a simple structure and a reasonable design, and may realize the dispersion of the strength by utilizing the special structure of the lock core, so the structural strength gets ensured, and meanwhile the buckle may be kept light-weighted, and thus the buckle is suitable for the pet industry.

1 Claim, 2 Drawing Sheets

BUCKLE

BACKGROUND OF THE INVENTION

The present invention relates to a buckle, specifically to a type of improved buckle achieving a better locking stability by structural modifications.

As a locking device, buckles are widely used. Because of the different using requirements of the buckle in different industries, buckles with a general structure usually may not meet some special using demands. Specifically, in the pet supplies industry, the buckle is mostly applied on horseback pet straps, or traction pet straps, pet bags, or pet retractors, due to the particularity of the industry, there are extremely high requirements on the buckle's impact resistance. More specifically, because of the pet hyperactivity, the buckle's lock would be impacted by an extremely huge instantaneous impact, and the buckle with a traditional structure would often get broken after getting used for a period of time, involving poor product durability. Although some buckles for pets are provided with an all-metal structure, due to the large weight of the metal, as well as its traditional structure, after being used for a period time, it will be inconvenient to pressure to open the buckle.

In summary, the traditional buckle may not properly meet the pet industry's using demands on the buckle, and there is an urgent need of a buckle with a lightweight and high structural strength, and may open conveniently after an impact.

BRIEF SUMMARY OF THE INVENTION

As it is an object of the present application to overcome the shortcomings of the prior art, an improved buckle applicable to be used in the pet industry is provided in this application.

In order to achieve the above object, an embodiment of the present disclosure provides a technical solution of an improved buckle, which includes a plastic shell, an inserting element, and a lock core. A horizontal socket fitting with the inserting element is formed on the plastic shell, and a cylindrical mounting slot is formed on the plastic shell for mounting the lock core, the cylindrical mounting slot communicating with the horizontal socket. The horizontal socket is provided with a guiding block. The inserting element is provided with an inserting piece for inserting into the horizontal socket to cooperate with the lock core, with two triangular notches symmetrically formed on the inserting piece. A guiding groove is formed on the inserting piece to cooperate with the guiding block. The lock core includes a left spring, a right spring, a left lock block, and a right lock block, the left lock block symmetrical configured with the right lock block, and the left lock block and the right lock block are coaxially aligned with each other, and interdigitates with each other. A first triangular protrusion and a second triangular protrusion are separately formed on front ends of the left lock block and the right lock block. The first triangular protrusion of the left lock block is placed into the right lock block, and the second triangular protrusion of the right lock block is inserted into the left lock block. A first receiving space is left between the front end of the right lock block and left lock block for receiving the left spring, a second receiving space is left between the front end of the left lock block and the right lock block for receiving the right spring, and through the left spring and the right spring, the coaxial displacement of the left lock block and the right lock block is realized. The first triangular protrusion and the second triangular protrusion are separately cooperating with the triangular notches of the inserting piece.

Compared with the prior art, the buckle in the present invention possesses advantages of a simple structure as well as a reasonable design, and may realize the dispersion of the strength by utilizing the special structure of the lock core, in which case, the structural strength gets ensured, and at the same time the buckle may be kept light-weighted, and thus the buckle is suitable for the pet industry.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE INVENTION

The present invention will hereinafter be described in detail with reference to an exemplary embodiment, for the purpose of further understanding the present invention.

Figure 1:
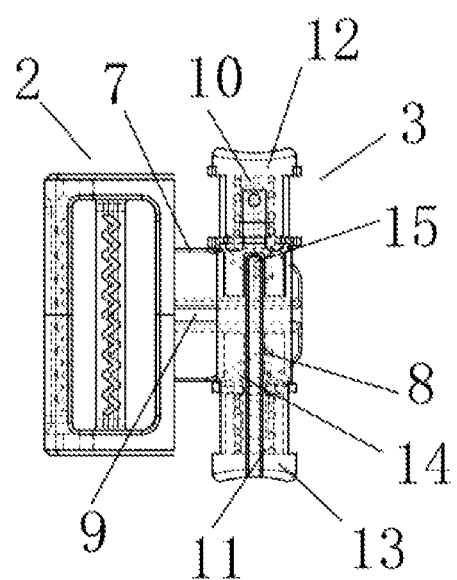
FIG. 1 is an illustrative structural view of an assembled buckle in accordance with an exemplary embodiment of the present invention.
Figure 2:
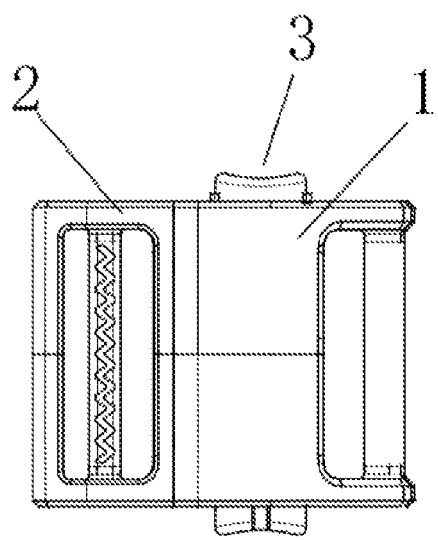
FIG. 2 is an illustrative view of a lock core and an insert element in accordance with the exemplary embodiment of the present invention.
Figure 3:
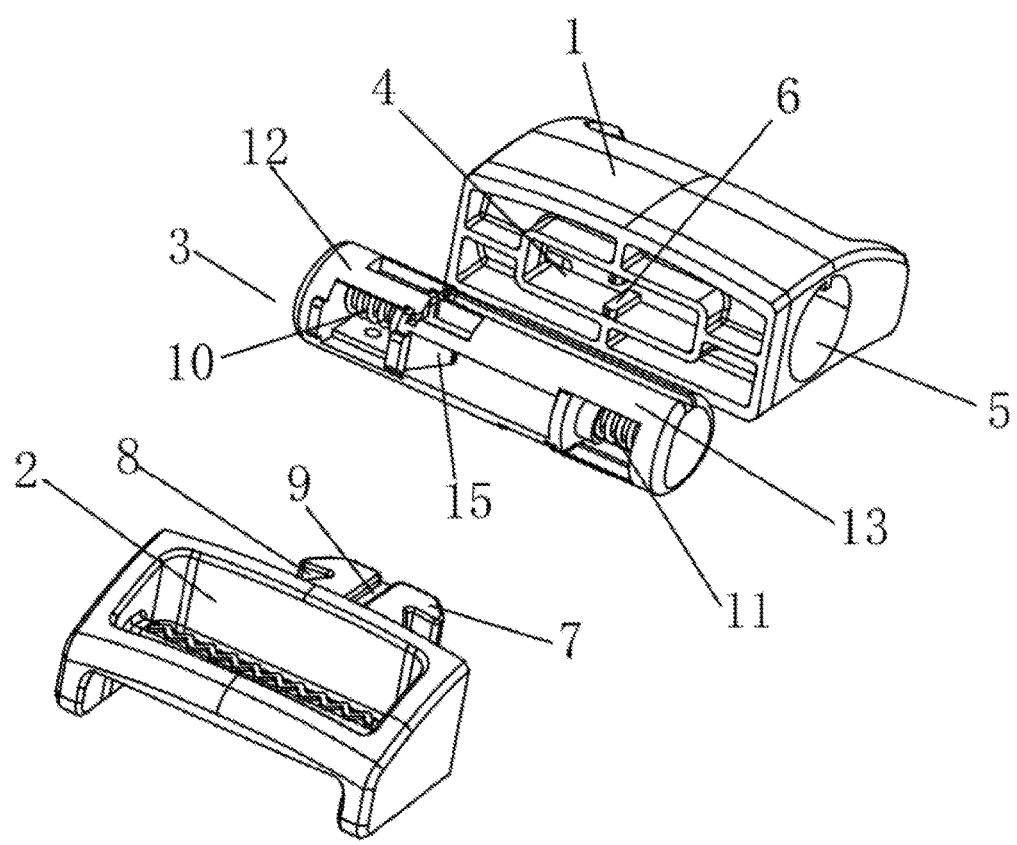
FIG. 3 illustrates a disassemble view of the present invention in accordance with the exemplary embodiment.

Referring to FIGS. 1-3, the buckle in an embodiment of the invention includes a plastic shell 1, an inserting element 2, and a lock core 3. A horizontal socket 4 is configured on the plastic shell 1 for fitting with the inserting element 2, and a cylindrical mounting slot 5 is configured on the shell 1 for the installation of the lock core 3. The cylindrical groove 5 is communicated with the horizontal socket 4. The horizontal socket 4 is provided with a guiding block 6, and the inserting element 2 is provided with an inserting piece 7 for inserting into the horizontal socket 4 to engage with the lock core 3, with two triangular notches 8 symmetrically formed on the inserting piece 7. The inserting piece 7 of the inserting element 2 is provided with a guiding groove 9 which cooperates with the guiding block 6. The lock core 3 includes a left spring 10, a right spring 11, a left lock block 12, and a right lock block 13, wherein the left lock block 12 is symmetrical with the right lock block 13, the left lock block 12 and the right lock block 13 are coaxially aligned with each other and interdigitating with each other. A first triangular protrusion 14 and a second triangular protrusion 15 are separately formed on front ends of the left lock block 12 and the right lock block 13. The first triangular protrusion 14 of the left lock block 12 is placed into the right lock block 13, and the second triangular protrusion 15 of the right lock block 13 is inserted into the left lock block 12. The left spring 10 is mounted in a first receiving space S1 between the front end of the right lock block 13 and left lock block 12, the right spring 11 is mounted in a second receiving space S2 between the front end of the left lock block 12 and the right lock block 13, and through the left spring 10 and the right spring 11, the coaxial displacement of the left lock block 12 and the right lock block 13 may be realized. The first triangular protrusion 14, and the second triangular protrusion 15 are separately cooperate with the triangular notches 8 of the inserting piece 7.

The foregoing embodiment is only an exemplary embodiment of the present invention and is not intended to limit the present invention, and any variations or modifications of equivalents made by one skilled in the art on the base of the technical contents disclosed above without departing from the principles and contents of the technical solution of the present invention, shall also fall into the scope of the invention. It is to be understood, however, that even though numerous characteristics and advantages of the present embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An improved buckle, comprising a plastic shell, an inserting element, and a lock core, wherein
    a horizontal socket fitting with the inserting element is formed on the plastic shell, and a cylindrical mounting slot is formed on the plastic shell for mounting the lock core, the cylindrical mounting slot communicating with the horizontal socket;
    the horizontal socket is provided with a guiding block;
    the inserting element Is provided with an inserting piece for inserting into the horizontal socket to cooperate with the lock core, with two triangular notches symmetrically formed on the inserting piece;
    a guiding groove is formed on the inserting piece to cooperate with the guiding block;
    the lock core comprises a left spring, a right spring, a left lock block, and a right lock block, the left lock block and the right lock block are symmetrical to each other, the left lock block and the right lock block are coaxially aligned with each other;
    a first triangular protrusion and a second triangular protrusion are separately formed on front ends of the left lock block and the right lock block;
    the first triangular protrusion of the left lock block is placed into the right lock block, and the second triangular protrusion of the right lock block is inserted into the left lock block;
    a first receiving space is left between the front end of the right lock block and left lock block for receiving the left spring, a second receiving space is left between the front end of the left lock block and the right lock block for receiving the right spring, and through the left spring and the right spring, coaxial displacement of the left lock block and the right lock block is realized;
    the first triangular protrusion and the second triangular protrusion separately cooperate with the triangular notches of the inserting piece.

\* \* \* \* \*